(12) United States Patent
Rybak (10) Patent No.: US 7,831,241 B2
(45) Date of Patent: *Nov. 9, 2010

(54) ENTERING CONTACTS IN A COMMUNICATION MESSAGE ON A MOBILE DEVICE

(75) Inventor: Rafal Rybak, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/574,749

(22) Filed: Oct. 7, 2009

(65) Prior Publication Data

US 2010/0029252 A1   Feb. 4, 2010

Related U.S. Application Data

(63) Continuation of application No. 11/286,330, filed on Nov. 25, 2005, now Pat. No. 7,620,387.

(60) Provisional application No. 60/637,766, filed on Dec. 22, 2004.

(51) Int. Cl.
    *H04M 1/66* (2006.01)
(52) U.S. Cl. .................. 455/412.1; 455/550.1; 455/403; 455/414.1; 455/466; 709/203; 709/206; 709/217; 709/219
(58) Field of Classification Search .............. 455/412.1, 455/550.1, 403, 414.1, 514, 432.3
    See application file for complete search history.

(56) References Cited

U.S. PATENT DOCUMENTS

| 6,199,106 | B1 | 3/2001 | Shaw et al. |
| 6,269,369 | B1 | 7/2001 | Robertson |
| 6,418,311 | B1 | 7/2002 | Chmaytelli et al. |
| 6,654,789 | B1 | 11/2003 | Bliss et al. |
| 6,684,248 | B1 | 1/2004 | Janacek et al. |
| 6,829,607 | B1 | 12/2004 | Tafoya et al. |
| 6,895,426 | B1 | 5/2005 | Cortright et al. |
| 7,120,424 | B1 | 10/2006 | Coan et al. |
| 7,206,791 | B2 | 4/2007 | Hind et al. |
| 7,475,113 | B2 | 1/2009 | Stolze |
| 2002/0065891 | A1 | 5/2002 | Malik |
| 2002/0087647 | A1 | 7/2002 | Quine et al. |
| 2003/0073429 | A1 | 4/2003 | Lim |
| 2003/0120737 | A1 | 6/2003 | Lytle et al. |

(Continued)

FOREIGN PATENT DOCUMENTS

CN    1151558 A    6/1997

(Continued)

OTHER PUBLICATIONS

European Examination Report dated May 14, 2009, European Patent Application No. 05814392.6.

(Continued)

*Primary Examiner*—Huy Phan
(74) *Attorney, Agent, or Firm*—Bereskin & Parr LLP/S.E.N.C.R.L.,s.r.l.

(57) ABSTRACT

Embodiments described herein provide a user with the ability to enter and validate contact addresses when composing a message on a mobile device. The user may access at least one of a local contact address data store and a remote contact address data store when entering and validating contact addresses.

18 Claims, 6 Drawing Sheets

U.S. PATENT DOCUMENTS

| | | |
|---|---|---|
| 2003/0208371 A1* | 11/2003 | McGrath .................... 705/1 |
| 2004/0059784 A1 | 3/2004 | Caughey |
| 2004/0153519 A1 | 8/2004 | Stolze |
| 2004/0171396 A1 | 9/2004 | Carey et al. |
| 2004/0198329 A1 | 10/2004 | Vasa |
| 2004/0266357 A1 | 12/2004 | Guchhait |
| 2005/0102368 A1 | 5/2005 | Forman et al. |
| 2005/0108344 A1 | 5/2005 | Tafoya et al. |
| 2005/0198144 A1 | 9/2005 | Kraenzel et al. |
| 2005/0266835 A1 | 12/2005 | Agrawal et al. |
| 2006/0035632 A1 | 2/2006 | Sorvari et al. |
| 2006/0276916 A1* | 12/2006 | Dearing et al. ............. 700/79 |
| 2008/0097847 A1* | 4/2008 | Perkowski et al. .......... 705/14 |

FOREIGN PATENT DOCUMENTS

| | | |
|---|---|---|
| GB | 2371948 | 7/2002 |
| WO | 00/57258 | 9/2000 |
| WO | 03/049460 | 6/2003 |

OTHER PUBLICATIONS

European Search Report dated Apr. 17, 2008, European Patent Application No. 05814392.6.

International Preliminary Report on Patentability (IPRP) for corresponding International Patent Application No. PCT/CA2005/001801 dated Apr. 23, 2007.

Notification Concerning Informal Communication with the Applicant for corresponding International Application No. PCT/CA2005/001801, date of mailing Mar. 21, 2007.

Chinese Office Action dated Dec. 11, 2009, Chinese Patent Application No. 200580048053.x.

* cited by examiner

ENTERING CONTACTS IN A COMMUNICATION MESSAGE ON A MOBILE DEVICE

CROSS REFERENCE TO RELATED APPLICATIONS

This application is a continuation of U.S. patent application Ser. No. 11/286,330, filed on Nov. 25, 2005, which claims the benefit of U.S. Provisional Application No. 60/637,766, filed on Dec. 22, 2004; the contents of application Ser. No. 11/286,330 and of Application No. 60/637,766 are hereby incorporated by reference.

FIELD

The embodiments described herein relate to message communication for a wireless communication device.

BACKGROUND

When a user composes a message, such as an e-mail message, for example, on a wireless communication device, the user composes the body of the message and may attach one or more relevant attachment documents. The user then enters header information, which includes entering information into the subject field and adding one or more recipient e-mail addresses in one of the "TO", "CC" or "BCC" address fields. In some wireless communication devices, these address fields are structured as free-form fields in which the user can enter any string of characters. The user then sends the message to the one or more recipients. Recipients will hereafter be referred to as contacts and recipient addresses will hereafter be referred to as contact addresses.

In certain message applications, the user may be prompted to enter an e-mail address by selecting the contact address from the device's local address book. If the desired contact address is not in the local address book, the user typically manually enters the contact address as a one-time entry. However, there is no provision for allowing the user to select a contact address that is not in the local address book, nor is there a way to check if a manually entered contact address is a valid address. For example, in some message applications, one may enter any string of characters as a contact address, such as the string "XXYYZZ", and the message application will consider this to be an acceptable contact address. The message application can then provide a confirmation box asking the user to confirm that the message is to be sent, but these message applications do not provide a validity check to ensure that each contact address is correct.

BRIEF DESCRIPTION OF THE DRAWINGS

For a better understanding of the embodiments described herein and to show more clearly how it may be carried into effect, reference will now be made, by way of example only, to the accompanying drawings which show at least one exemplary embodiment in which:

FIG. 3 is a block diagram of an exemplary embodiment of a node of a wireless network that the mobile communication device of FIG. 1 may communicate with;

FIG. 4 is a block diagram of an exemplary embodiment of a host system that the mobile communication device of FIG. 1 may communicate with;

DETAILED DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein.

The embodiments described herein generally relate to contact address validation for a message. To facilitate an understanding of the embodiments provided herein, the embodiments will be described in terms of contact address validation for e-mail messages on a mobile wireless communication device, hereafter referred to as a mobile device, that can send and receive wireless messages. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Figure 1:
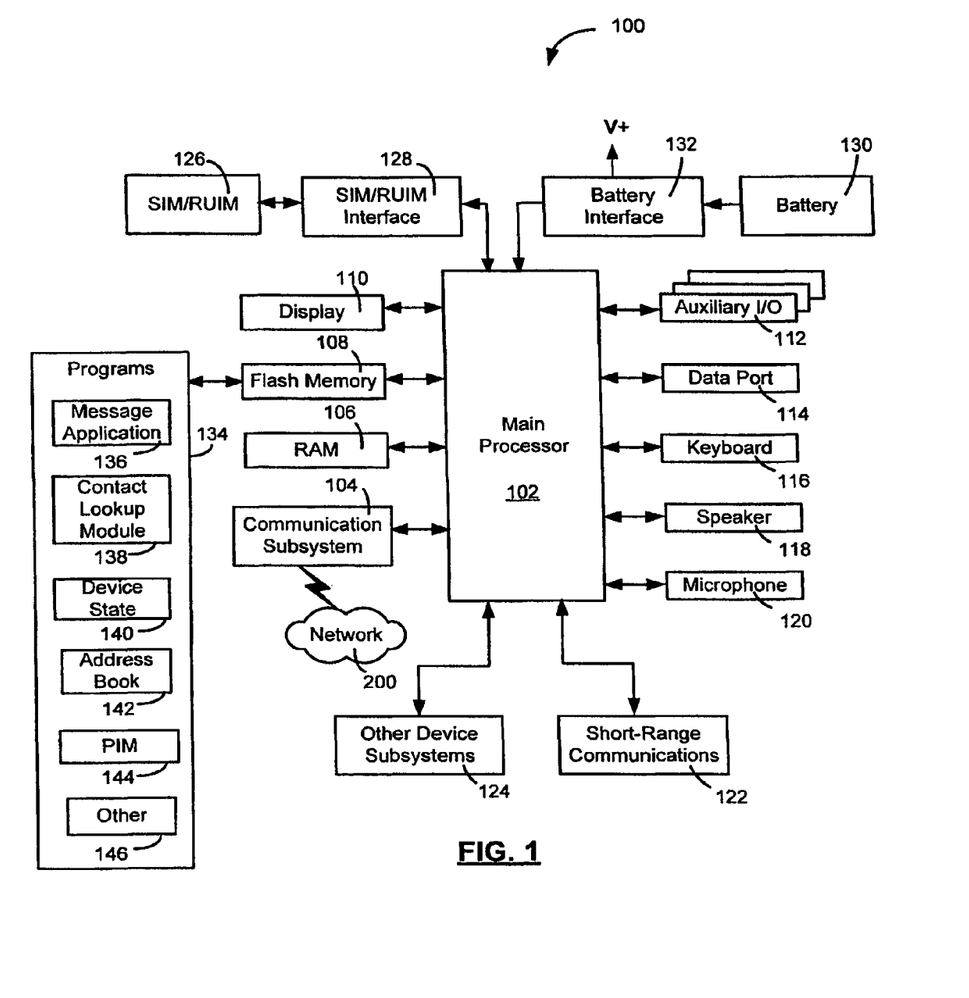
FIG. 1 is a block diagram of an exemplary embodiment of a mobile communication device.

Referring first to FIG. 1, shown therein is a block diagram of a mobile device 100 in one exemplary implementation. The mobile device 100 comprises a number of components, the controlling component being a main processor 102 that controls the overall operation of the mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the wireless network 200, and device-resident functions such as a calculator or task list. Operating system software used by the main processor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The mobile device 100 may send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The main processor 102, in addition to its operating system functions, enables execution of software applications 134 on the mobile device 100. The subset of software applications 134 that control basic device operations, including data and voice communication applications, will normally be installed on the mobile device 100 during its manufacture.

The software applications 134 include a message application 136. The message application 136 can be any suitable software program that allows a user of the mobile device 100 to send and receive messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages may be stored remotely from the mobile device 100 such as in a data store of an associated host system that the mobile device 100 communicates with.

Another program that is executed by the mobile device 100 is a contact lookup module 138 that operates in combination with the message application 136 for aiding with entry and validation of one or more contact addresses in a message before the message is transmitted by the mobile device 100. Aiding with contact address entry includes providing the user with the ability to lookup a contact address. Validation includes checking the accuracy of a contact address that has been entered by the user while composing the message. Validation can further include correcting an inaccurate contact address.

The contact lookup module 138 aids with entry of a contact address by allowing the user of the mobile device 100 to look up a contact address by checking at least one of a local contact address data store and a remote contact address data store. The contact lookup module 138 can validate an entered contact address by checking with the local contact address store. In some embodiments, the contact lookup module 138 can perform validation of an entered contact address by checking with the user. In some embodiments, the contact lookup module 138 can perform validation of an entered contact address by checking with a remote contact address data store.

The mobile device 100 further includes a device state module 140, an address book 142, a Personal Information Manager (PIM) 144, and other modules 146. The device state module 140 provides persistence, i.e. the device state module 140 ensures that important device data is stored in persistent memory, such as the flash memory 108, so that the data is not lost when the mobile device 100 is turned off or loses power. The other modules 146 may include a configuration module (not shown) as well as other modules that can be used in conjunction with the SIM/RUIM interface 128.

The address book 142 provides information for a list of contacts for the user. For a given contact in the address book, the information can include the name, phone number, work address and e-mail address of the contact (i.e. contact address), among other information. The address book 142 provides an example of a local data store of contact addresses that can be used by the user of the mobile device 100 when composing an e-mail message as well as the contact lookup module 138 during contact address entry or validation.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications may also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
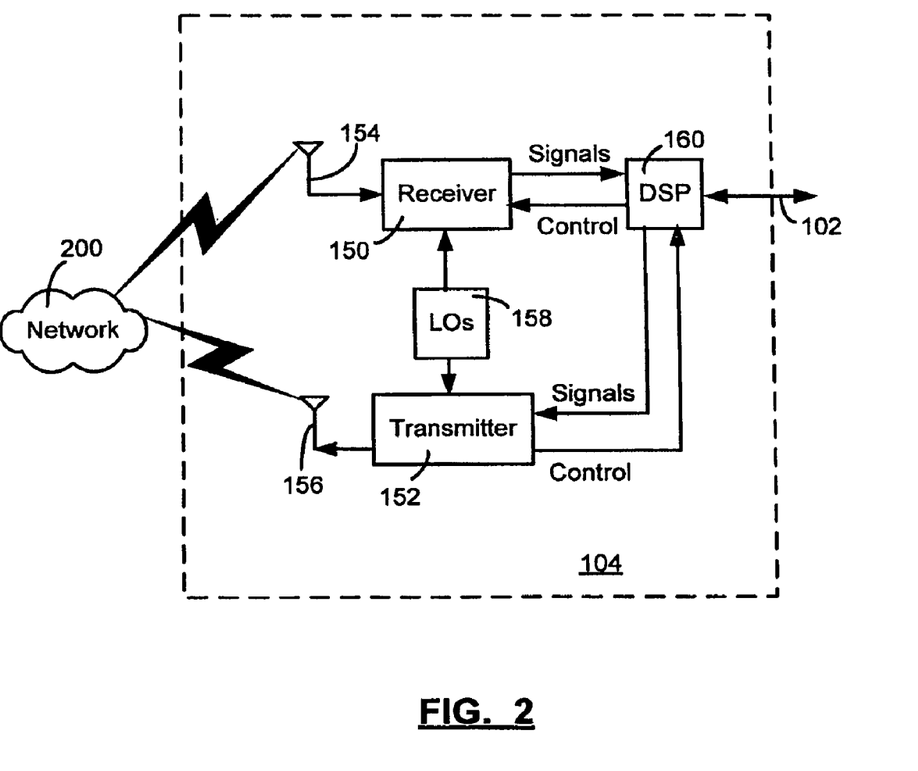
FIG. 2 is a block diagram of a communication subsystem component of the mobile communication device of FIG. 1.

Referring now to FIG. 2, a block diagram of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a processing module such as a Digital Signal Processor (DSP) 160. As will be apparent to those skilled in the field of communications, the particular design of the communication subsystem 104 is dependent upon the communication network with which the mobile device 100 is intended to operate. Thus, it should be understood that the design illustrated in FIG. 2 serves only as one example.

Signals received by the antenna 154 through the wireless network 200 are input to the receiver 150. The receiver 150 can perform such common receiver functions as signal amplification, frequency down conversion, filtering, channel selection, and analog-to-digital (A/D) conversion. A/D conversion of a received signal allows more complex communication functions such as demodulation and decoding to be performed by the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and transmitter 152 can be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100. Accordingly, when the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
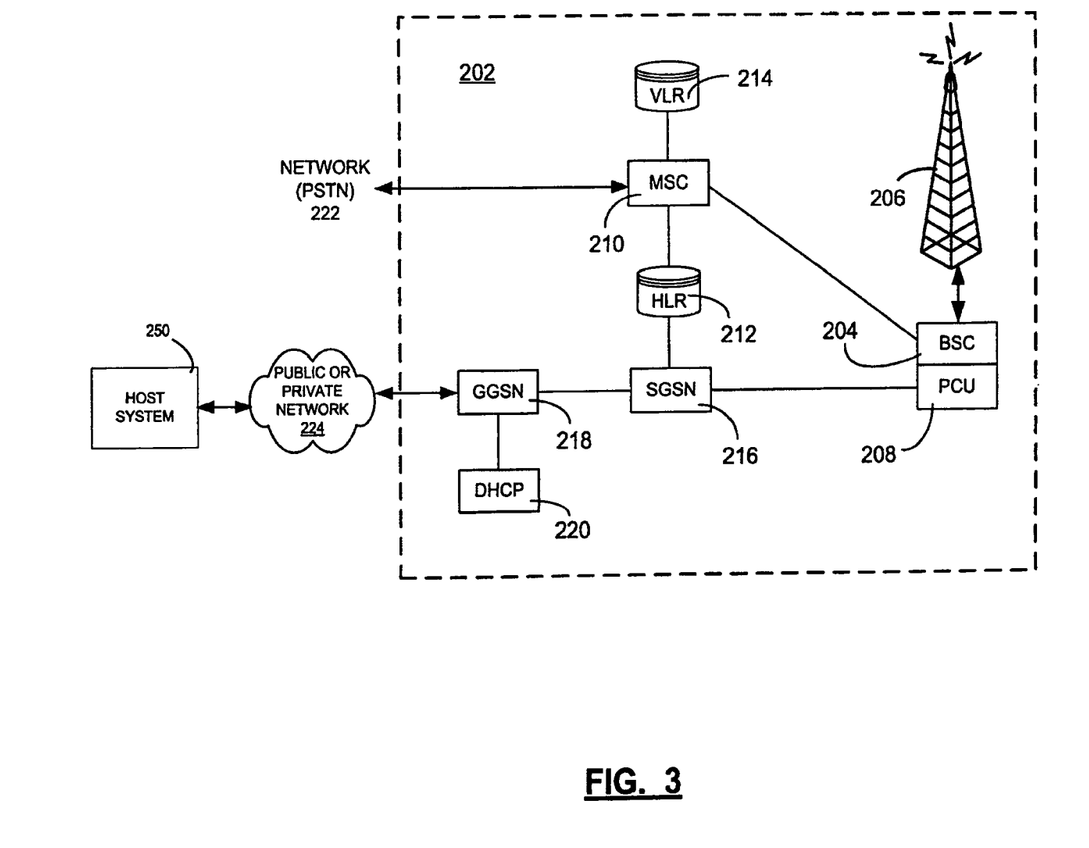

Referring now to FIG. 3, a block diagram of an exemplary implementation of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the wireless network 200.

In a GSM network, the MSC 210 is coupled to the BSC 204 and to a landline network, such as a Public Switched Telephone Network (PSTN) 222 to satisfy circuit-switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the wireless network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
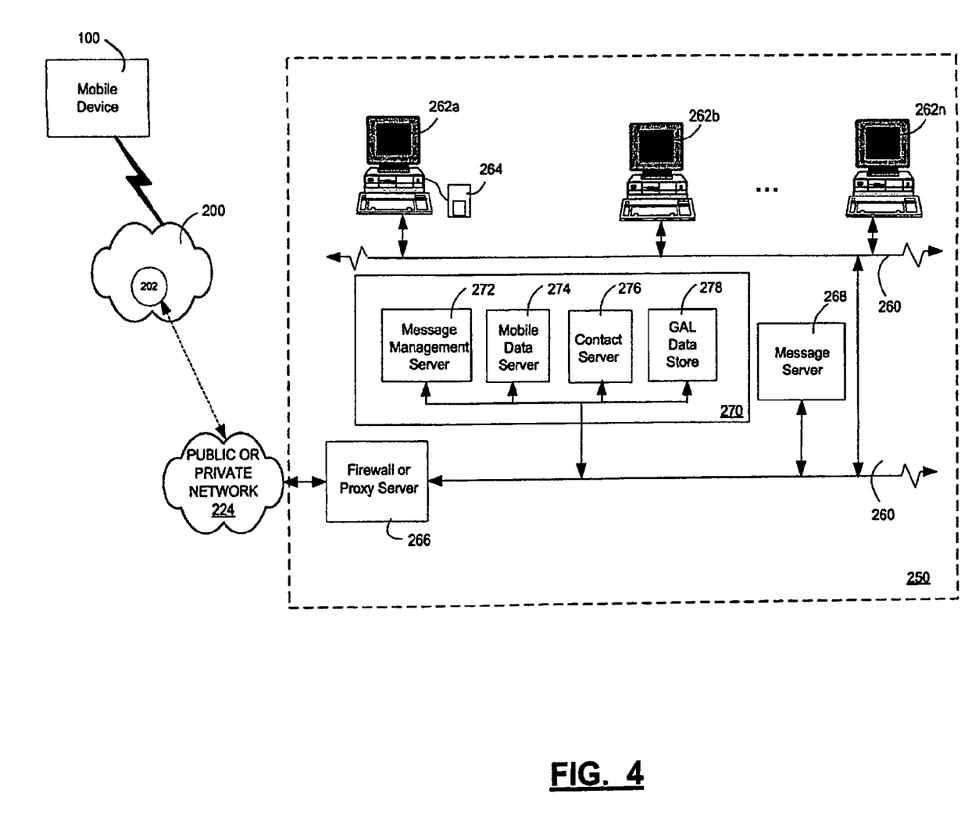

Referring now to FIG. 4, shown therein is a block diagram illustrating components of an exemplary configuration of a host system 250. In one instance, the host system 250 can be a corporate enterprise. The host system 250 will typically be a corporate office or other local area network (LAN), but may also be a home office computer system or some other private system, for example, in variant implementations. In the example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 comprises a number of network components connected to each other by network connections 260. For instance, a user's desktop computer 262a with an accompanying cradle 264 for the user's mobile device 100 can be situated on a LAN connection. The cradle 264 for the mobile device 100 can be coupled to the computer 262a by a serial or a Universal Serial Bus (USB) connection, for example. Other user computers 262b-262n can also be situated on the network 260, and each may or may not be equipped with an accompanying cradle 264 that is suitable for a mobile device. The cradle 264 facilitates the loading of information (e.g. PIM data, private symmetric encryption keys to facilitate secure communications between the mobile device 100 and the host system 250, etc.) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and can include different components and/or be arranged in different topologies than that shown in the exemplary embodiment of FIG. 4.

To facilitate the wireless communication of messages and message-related data between the mobile device 100 and components of the host system 250, a number of wireless communication support components 270 may be provided. In some implementations, the wireless communication support components 270 can include a message management server 272, a mobile data server 274, a contact server 276, a global address list data store 278, and the like.

In this exemplary embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise server, or another suitable mail server installed in a corporate environment. In some implementations, the host system 250 may include multiple message servers 268. The message server 268 may also be adapted to provide additional functions beyond message management, including the management of data associated with calendars and task lists, for example.

When messages are received by the message server 268, they are typically stored in a data store associated with the message server 268. In some embodiments, the data store may be a separate hardware unit (not shown) that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (in the past two to three months for example) can be stored on the mobile device 100.

When operating the mobile device 100, the user may wish to have e-mail messages retrieved for delivery to the mobile device 100. An e-mail client application operating on the mobile device 100 may also request messages associated with the user's account from the message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES) or Triple DES) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in one instance, when a message is initially retrieved by the mobile device 100 from the message server 268, the message management server 272 may push only the first part of a message to the mobile device 100, with the part being of a pre-defined size (e.g. 2 KB). The user can then request more of the message, to be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion to the address book 142 on the mobile device 100. The contact server 276 can obtain this information from the Global Address List (GAL) data store 278. The GAL data store 278 can store contact information for people or groups within a corporation. The GAL data store 278 can also include contact information for other contacts such as people from organizations associated with the corporation, such as suppliers, clients, etc., as well as contacts that are commonly accessed. For a given contact, the contact server 276 can generally provide the name, phone number, work address and e-mail address of the contact, among other information. The contact server 276 and the GAL data store 278 are an example of a remote data store that the contact lookup module 138 can access during entry or validation of a contact address on the mobile device 100.

In some embodiments, the GAL data store 278 can also include a separate list of contacts for each user that uses a mobile device associated with the host system 250. In this fashion, the GAL data store 278 can provide a backup of contact lists or the local address books that are stored on the plurality of mobile devices associated with the host system 250. In some alternative embodiments, the host system 250 may have a centralized server that can access the contact information.

It will be understood by persons skilled in the art that the message management server 272, the mobile data server 274 and the contact server 276 need not be implemented on separate physical servers within the host system 250. For example, some or all of the functions associated with the message management server 272 may be integrated with the message server 268, or some other server in the host system 250. Furthermore, the host system 250 may comprise multiple message management servers 272, particularly in variant implementations where a large number of mobile devices need to be supported. Furthermore, in some embodiments, the functionality of the contact server 276 may be provided by another server such as the message management server 272 or the message server 268. In addition, in some embodiments, the functionality of the contact server 276 can be provided by another corporate server that can provide additional functionality. Further, in some embodiments, the contact server 276 can be provided by a third party. In some cases, the remote facility can be associated with a website accessible by the Internet. In any of these cases, the contact server 276 or the third party services can be referred to as a remote contact service. Further, any data sent from the remote contact service to the mobile device can be referred to as contact data. Contact data can include a confirmation or approval that a potentially incorrect contact address has a match in a remote contact address data store. Contact data can also include a disapproval that a potentially incorrect contact address does not have a match in a remote contact address data store. Contact data can also include a list of contact addresses found in a remote contact address data store that are similar to a potentially incorrect contact address.

When the user of the mobile device 100 composes a message, the user may enter a contact address by using the local address book 142 that is stored on the mobile device 100. For instance, the contact lookup module 138 can provide the user with an option to look up a contact address when the user is adding an address to one of the address fields of the message. This can be done after the user selects one of the address fields in order to make an entry. The user can then select a contact address from the address book 142 via the contact lookup module 138. In some cases, the default may be to place the cursor in one of the address fields and then let the user choose to use the contact lookup module 138 to access the address book 142 to enter a contact address. In some cases, the contact lookup module 138 can provide this "local" lookup option by displaying a dialog window or by interfacing with the message application 136 to provide a selection button in the message window within which the user composes the message. In some embodiments, the user may enter the first few characters of a contact address in an address field and then use a local lookup option provided by the contact lookup module 138 to obtain a list of matching addresses from the local address book 142 from which the user can make a selection. In some cases, the contact lookup module 138 can be configured to automatically provide the list of matching contact addresses.

In some embodiments, if no matching addresses are found that correspond to the first few characters that are entered by the user in an address field, the user can select a remote lookup option provided by the contact lookup module 138 to select a contact address from a remote data store such as the GAL data store 278. If the user chooses the remote lookup option, the contact lookup module 138 can contact the contact server 276, which then provides the user with the ability to search for a contact address in the GAL data store 278. In some implementations, the contact server 276 can provide the user with a list that the user can scroll through to locate and select the desired contact address. In some implementations, the user can enter a few characters via a dialog window. The contact lookup module 138 can then provide these characters to the contact server 276, which then uses the characters to search for matching contact addresses or contact names. The contact server 276 can then provide the matching contact entries to the contact lookup module 138, which then displays the entries to the user. The user can then scroll through the list of matching contact entries to see if a desired contact address is in the list.

In some embodiments, the user is provided with the option of manually entering the contact address. In some cases, the user can manually enter the contact address without searching through the local and remote address stores (i.e. without using the local or remote lookup option provided by the contact lookup module 138). In some cases, the user can manually enter the contact address after the desired contact has not been found in the local address store. In some cases, the user can manually enter the contact address after the desired contact has not been found in the remote address store.

Figure 5:
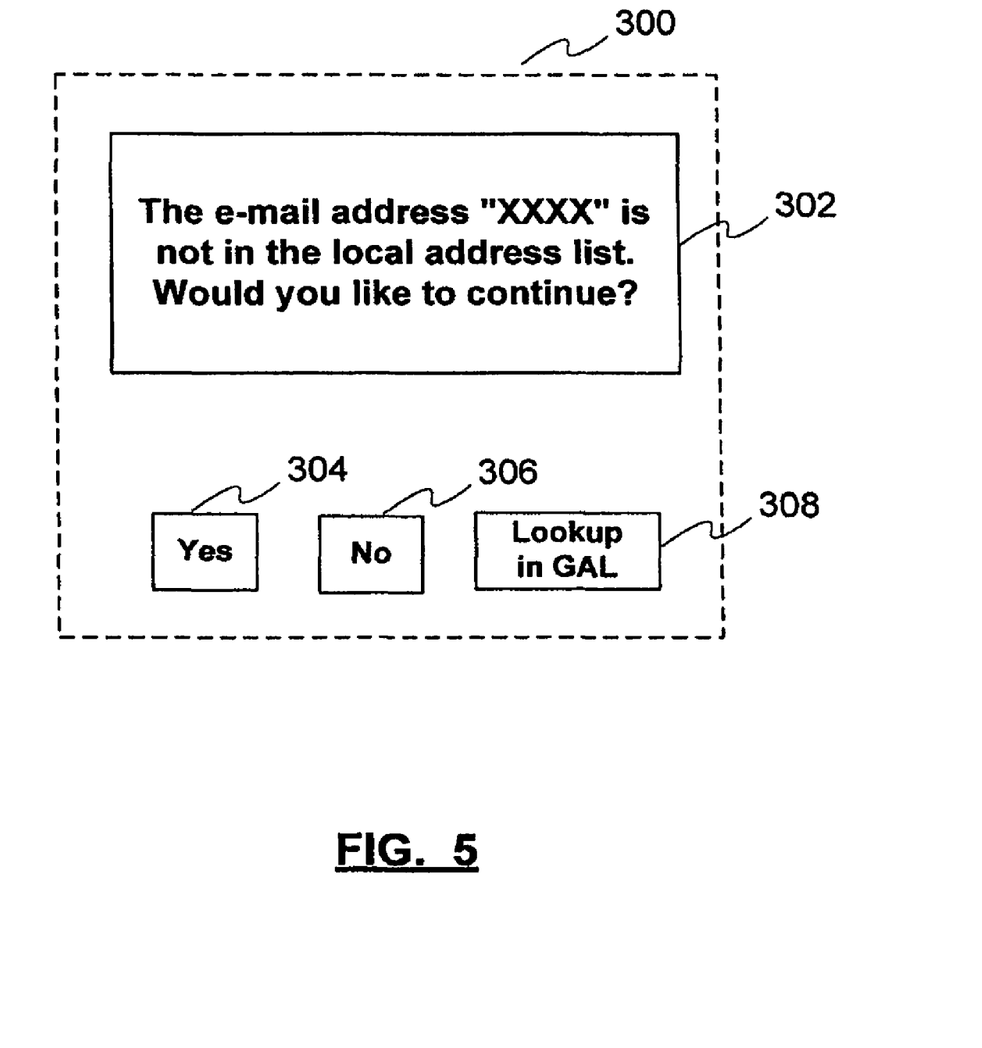
FIG. 5 is a diagram of an exemplary embodiment of a message validation window for validating contact addresses in a message; and, FIG. 6 is a flow chart diagram illustrating an exemplary embodiment of a contact entry method for entering and validating contact addresses in a message.

After the user has entered the contact addresses for the message, prior to sending the message, the contact lookup module 138 validates the contact addresses. Validation includes checking the contact addresses for accuracy and correcting any potentially incorrect contact addresses. FIG. 5 provides a diagram of an exemplary embodiment of a message validation window 300 for validating contact addresses in a message. The message validation window 300 is one example of a message validation means that can be provided by the contact lookup module 138 to verify and correct potentially incorrect contact addresses.

In some embodiments, the contact lookup module 138 can attempt to verify each manually entered contact address in any of the "TO", "CC" or "BCC" address fields of the message by finding matching contact addresses in the local address book 142. If all of the manually entered contact addresses match with a corresponding entry in the address book 142, then the e-mail message can be sent by the message application 136.

However, if the contact lookup module 138 cannot find matching contact addresses in the address book 142 for at least one of the manually entered contact addresses, then there is at least one potentially incorrect contact address in the one of the address fields of the message. In the example shown in FIG. 5, the string "XXXX" is an example of a potentially incorrect contact address. The contact lookup module 138 can then search the address book 142 for contact addresses that are similar to the potentially incorrect contact address(es). If similar contact addresses are found, then the contact lookup module 138 can display a list of the similar contact addresses to the user. The user can then select one of the similar contact addresses if it is the correct contact address that the user actually intended to enter in one of the address fields of the message. For instance, the user may have misspelled or transposed a few characters when entering a contact address thereby generating the potentially incorrect contact address. The selected similar contact address can then be substituted for the potentially incorrect contact address in the appropriate address field in the message.

In some embodiments, if there are still some unresolved potentially incorrect contact addresses, the contact lookup module 138 can then provide the message validation window 300 to the user. The message validation window 300 is used to notify the user that a contact address (in this case an e-mail address) cannot be validated with the entries in the local address book 142 and is a potentially incorrect contact address. The message validation window 300 includes a dialog message 302 and option buttons 304, 306 and 308. The dialog message 302 indicates that an entered contact address is unrecognized and can be a potentially incorrect contact address. The user is then provided with several options. In this exemplary embodiment, there can be an accept option button 304 in which the user chooses to continue to send the message thereby accepting that the potentially incorrect contact address is actually correct. There can be a decline option button 306 in which the user recognizes that the potentially incorrect contact address is actually incorrect and decides not to proceed with sending the message. There can also be a remote lookup option button 308 in which the user is not sure about the accuracy of the potentially incorrect contact address and wishes to check the accuracy of the potentially incorrect contact address with the contact server 276.

If the user selects the remote lookup option button 308, then the contact lookup module 138 sends a contact address validation request to the contact server 276. The contact address validation request includes the potentially incorrect contact address. The contact server 276 then checks the GAL data store 278 to determine if there is a corresponding matching contact address for the potentially incorrect contact address. If a matching contact address is found in the GAL data store 278, the contact server 276 sends an approval response to the contact lookup module 138. Otherwise, if a matching contact address is not found in the GAL data store 278, the contact server 276 sends a disapproval response to the contact lookup module 138.

In some embodiments, when a direct matching address cannot be found in the GAL data store 278 for the potentially incorrect contact address, the contact server 276 can search the GAL data store 278 for contact addresses that are similar to the potentially incorrect contact address. If similar contact addresses are found, the contact server 276 can send a list of the similar contact addresses to the contact lookup module 138. The contact lookup module 138 can then display the list to the user. The user can then select one of the similar contact addresses if it is actually the desired contact address. Once again, this can be a case in which the user may have misspelled or transposed a few characters when entering the contact address in one of the address fields of the message. The selected similar contact address can then be substituted for the potentially incorrect contact address in the appropriate address field in the message.

The contact lookup module 138 then checks to determine if there are other potentially incorrect contact addresses in the message. If there are no other potentially incorrect contact addresses, an additional message confirmation screen can be displayed, as is commonly known to those skilled in the art, to ask the user if the message should be sent. If the user chooses to send the e-mail, then the e-mail message can be sent with no further changes.

Messages sent with potentially incorrect contact addresses can generate a message delivery error or a "bounced message" that is returned to the sender if the potentially incorrect contact address is actually incorrect. As such, it is generally not recommended for the user to send an e-mail message in which potentially incorrect contact addresses have not been validated.

In some embodiments, the contact lookup module 138 can validate all contact addresses which includes addresses that have been selected from entries in the local address book 142 and the GAL data store 278 since some entries in either the address book 142 and the GAL data store 278 may have been improperly entered. The contact lookup module 138 can accomplish this by determining if the contact addresses have the proper syntax for an acceptable e-mail address, in the case of e-mail messages. For other embodiments in which other types of messages are to be sent, the contact lookup module 138 can check to determine whether the syntax that corresponds to the particular type of message has been used for the contact address.

If the user selects the second choice of not continuing with sending the message, (i.e., selecting the "No" option button 306), the user can be returned to the message composition window. At this time, the user can edit or modify the potentially incorrect contact address(es) in any of the address fields. After modifying the potentially incorrect contact address, in some embodiments, the modified contact address is assumed to be correct and the remaining contact addresses can then be checked. In some cases, the modified contact address may be checked to ensure that the proper address syntax is used. In some cases, the validation process may be repeated on the potentially incorrect contact addresses that have been corrected or modified. Once all of the potentially incorrect contact addresses have been modified, and possibly checked and validated, a message confirmation screen can appear asking the user to confirm sending the message.

In some embodiments, the message validation window may contain an edit option (not shown). The user can select the edit option when the user recognizes that a potentially incorrect contact address is actually incorrect. In some cases, when the edit option is selected an edit window can be displayed which allows the user to edit the potentially incorrect contact address rather than having to go back to the message composition window. At this point, it can be assumed that the user has properly corrected the potentially incorrect contact address. However, in some implementations, the contact lookup module 138 can check the contact address to ensure that the proper address syntax has been used. In some implementations, the contact lookup module 138 can also search at least one of the address book 142 and the GAL data store 278 for a match for the corrected contact address. In some implementations, the contact lookup module 138 can query whether the user wishes to check the corrected contact address with the GAL data store 278 since this can result in perceptible delay to the user in some cases.

If more than one contact address has been found to be potentially incorrect, in some embodiments, the message validation window 300 can appear multiple times, i.e. once for each potentially incorrect contact address. In some embodiments, all of the potentially incorrect contact addresses can be listed within a message validation window. The user can then go through the potentially incorrect contact addresses one by one by selecting one of the different options (i.e. accept, decline, edit, and remote lookup).

Figure 6:
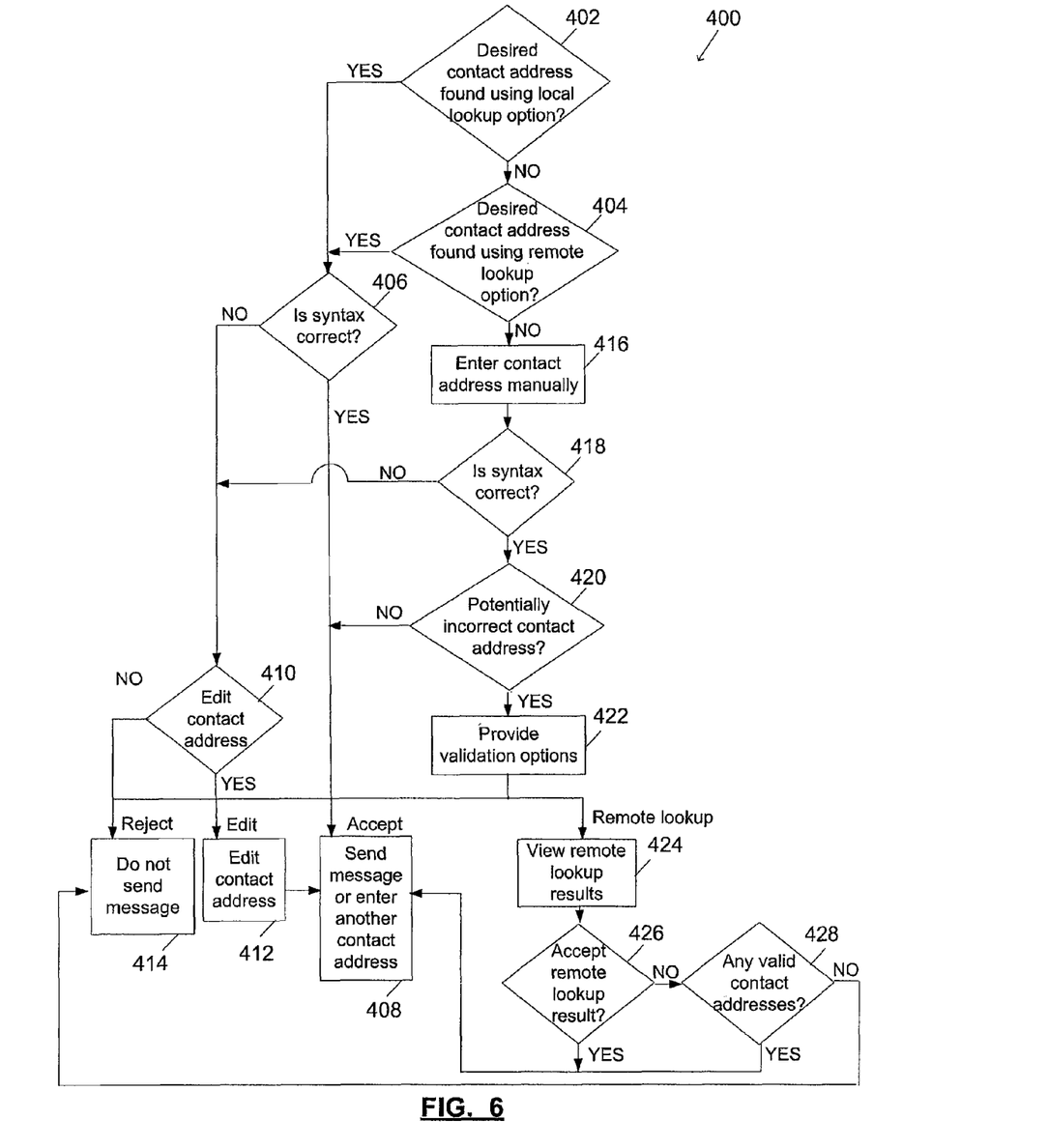

Referring now to FIG. 6, shown therein is a flow chart diagram illustrating an exemplary embodiment of a contact entry method 400 for entering and validating contact addresses in a message. The method 400 begins when the user composes an e-mail message and needs to enter a desired contact address in one of the address fields of the message but is not sure of the exact contact address or does not want to manually enter the entire contact address. At step 402, the user uses the local lookup option to search a local contact address data store to enter the desired contact address. This option can be provided by an input means on the message composition window, such as an input button, tab, drop down menu and the like. Alternatively, this local lookup option can be automatic once the user begins to enter a few characters of the desired contact address or a few characters of the name that corresponds to the desired contact address into one of the address fields of the message. In some cases, the contact lookup module 138 can display a list of the contact addresses in the local contact address data store that the user can scroll through. In some cases, the contact lookup module 138 can display a list of contact addresses found in the local contact address data store that match the characters that have been typed in thus far by the user.

If the user does not find the desired contact address using the local lookup option, or does not choose to use the local lookup option, the method 400 moves to step 404 at which point the user can use the remote lookup option to find a desired contact address in a remote contact address data store. Once again, this option can be provided by an input means on the message composition window, such as an input button, tab, drop down menu and the like. Alternatively, in some embodiments this remote lookup option can be automatic if the user does not select any of the contact addresses found by the local lookup option. In some implementations, a connection can be made with a remote contact server that provides access to the remote contact address data store and can display a list of contact addresses. In some cases, this can be done via an Internet or other network interface. The contact lookup module 138 can create a contact lookup request that is then sent across the wireless network 200 to the contact server 276, or another suitable server, which interfaces with a remote contact address data store. In some implementations, if the user enters a few characters of either the desired contact address or the name of the contact, the remote contact server can produce a list of matching contact addresses from the remote contact address data store and send the list to the mobile device 100. The contact lookup module 138 can then display the list to the user.

If the user selects one of the contact addresses via either the local lookup option or the remote lookup option, the method 400 then goes to step 406 to ensure that the syntax of the selected contact address is in the proper format for the type of message that the user will be sending. If the syntax is correct, the method 400 moves to step 408 at which point the user can send the message or enter further contact addresses. If the syntax is not correct, the method 400 moves to step 410 at which point the user can choose to edit the selected contact address. If the user chooses to edit the selected contact address, the method 400 moves to step 412 where the user then edits the contact address or enters an alternate contact address and the method 400 then moves to step 408. If the user chooses not to edit the selected contact address, the method 400 moves to step 414 and the message is not sent.

If the user chooses not to use the remote lookup option, or if the remote lookup option was not successful, the method 400 moves to step 416 at which point the user can manually enter the contact address. The syntax of the manually entered contact address is then checked in step 418. If the syntax of the manually entered contact address is not correct, then the method 400 moves to step 410. Otherwise, the method 400 moves to step 420 and the manually entered contact address is compared to the local contact address store to determine if there is a matching contact address. If there is a matching contact address, the method 400 moves to step 408.

If there is no matching contact address, then the contact address can be a potentially incorrect contact address. The contact lookup module 138 then provides several validation options to the user at step 422. The user can reject the potentially incorrect contact address in which case the method 400 moves to step 414 and the message is not sent. Alternatively, the user can choose to edit the potentially incorrect contact address and the method moves to step 412. In this case, the user recognizes that the potentially incorrect contact address is actually incorrect, knows the correct contact address and corrects the contact address. Alternatively, the user can select the remote lookup option. The results obtained by the remote contact server are viewed in step 424. At step 426, if the user selects one of the results, the method 400 moves to step 408. Alternatively, if the user does not accept any of the results at step 426, then the method 400 moves to step 428. At step 428, it is determined whether there are any valid contact addresses in the address fields of the message, and if so the method 400 then moves to step 408. Otherwise, if there are no valid contact addresses in the address fields of the message, then the method 400 moves to step 414 and the message is not sent.

The above-described embodiments are provided for exemplary purposes. Accordingly, there can be similar embodiments that do not include all of the features disclosed herein or that have slightly modified features. For instance, rather than there being a GAL data store 278, there may be a list that is customized for particular users, or there may be several customized lists according to the department within which the user works. There may also be customized lists based on third parties that the user, or the department within which the user works, usually interacts with. Other alternatives include an online contact list, a user-defined customized list or an instant messaging list of contacts. Other alternatives are also possible.

The remote lookup aspect of the embodiments described herein provides several benefits. For instance, one can assume that the remote contact address store is always up to date. Further, usage of the remote contact address store frees up memory on the mobile device 100. In addition, the memory components of the mobile device 100 may not be large enough to contain the entire contact list of larger companies. Further, the use of the remote contact address data store minimizes local data entry. Not only does one get the entire contact entry after typing in just the name of the contact (or even just a part of the name or part of the contact address of the contact), but typing errors which can be expected in the course of entering that same information are eliminated. Further, the remote contact address lookup can be performed wirelessly which means that the user does not need to be in the office to retrieve contact information or contact data.

In one aspect, at least one embodiment described herein provides a method of contact address entry for messages composed by a user on a mobile communication device. The method comprises:

a) allowing the user to enter at least one contact address in an address field in the message;

b) checking for at least one potentially incorrect contact address by identifying at least one manually entered contact address that does not have a matching entry in a local contact address data store; and, c) validating the at least one potentially incorrect contact address.

In at least some cases, step (c) includes allowing the user to check a remote contact address data store for a matching entry for the at least one potentially incorrect contact address.

In at least some cases, step (c) includes allowing the user to manually correct the at least one potentially incorrect contact address.

In at least some cases, at least one of: step (b) includes providing the user with a list of similar contact addresses found in the local contact address data store compared to the at least one potentially incorrect contact address, and step (c) includes providing the user with a list of similar contact addresses found in the remote contact address data store compared to the at least one potentially incorrect contact address.

In at least some cases, step (b) includes checking the at least one entered contact address for proper syntax.

In at least some cases, step (a) includes contacting a remote contact service to allow the user to browse a remote contact address store to enter the at least one contact address.

In at least some cases, step (a) includes allowing the user to enter a few characters of one of a desired contact address and a name associated with the desired contact address and providing the user with a list of matching contact addresses found in the remote contact address data store.

In at least some cases, step (c) includes providing a validation means for allowing the user to either accept the at least one potentially incorrect contact address as a correct contact address, correct the at least one potentially incorrect contact address or remotely lookup a correct contact address for the at least one potentially incorrect contact address.

In another aspect, at least one embodiment described herein provides a computer program product for allowing a user of a mobile device to enter contact addresses when composing a message on the mobile device, the computer program product comprising a computer readable medium embodying program code means executable by a processor of the mobile device for implementing various embodiments of a contact address entry method as specified above.

In yet another aspect, at least one embodiment described herein provides a mobile communication device comprising a main processor for controlling the operation of the mobile communication device; a communication subsystem connected to the main processor, the communication subsystem being adapted for wirelessly sending and receiving data; a message application that interfaces with the communication subsystem to send and receive messages, and to receive contact data from a remote contact service; a local contact address data store; and, a contact lookup module for allowing a user to enter at least one contact address in an address field in a message composed using the message application, check for at least one potentially incorrect contact address by identifying at least one manually entered contact address that does not have a matching entry in the local contact address data store; and, validate the at least one potentially incorrect contact address.

In at least some cases, the contact lookup module allows the user to check a remote contact address data store for a matching entry for the at least one potentially incorrect contact address.

In at least some cases, the contact lookup module allows the user to manually correct the at least one potentially incorrect contact address.

In at least some cases, during at least one of checking and validation, the contact lookup module is adapted to provide the user with a list of similar contact addresses found in a contact address data store compared to the at least one potentially incorrect contact address.

In at least some cases, the contact lookup module checks the entered contact addresses for proper syntax.

In at least some cases, the contact lookup module is adapted to contact a remote contact service to allow the user to browse a remote contact address store to enter the at least one contact address.

In yet another aspect, at least one embodiment described herein provides a system comprising a mobile device including: a main processor for controlling the operation of the mobile device; a communication subsystem connected to the main processor, the communication subsystem being adapted for wirelessly sending and receiving data; a message application that interfaces with the communication subsystem to send and receive messages, and to receive contact data; a local contact address data store; and, a contact lookup module for allowing a user to enter at least one contact address in an address field in a message composed on the mobile device, check for at least one potentially incorrect contact address by identifying at least one manually entered contact address that does not have a matching entry in the local contact address data store; and, validate the at least one potentially incorrect contact address. The system further includes a remote contact service for providing the contact data to the mobile device, the contact data including at least one contact address; and, a wireless network for providing communication between the mobile device and the remote contact service.

In at least some cases, the contact lookup module allows the user to check a remote contact address data store for a matching entry for the at least one potentially incorrect contact address.

In at least some cases, the contact lookup module allows the user to manually correct the at least one potentially incorrect contact address.

In at least some cases, during at least one of checking and validation, the contact lookup module is adapted to provide the user with a list of similar contact addresses found in a contact address data store compared to the at least one potentially incorrect contact address.

In at least some cases, the contact lookup module checks the entered at least one contact address for proper syntax.

In at least some cases, the remote contact service is provided by a contact server associated with one of a corporate enterprise and a website.

These and other features of the embodiments provided herein have been described above.

It should be understood that various modifications can be made to the embodiments described and illustrated herein, without departing from the embodiments, the general scope of which is defined in the appended claims. It should also be understood that while the embodiments were described for a mobile device, the embodiments are generally applicable to any communication or computing device that allows a user to compose a message that requires contact addresses for delivery.

The invention claimed is:

1. A method of contact address entry for messages composed on a mobile communication device, wherein the method comprises:
   detecting entry of at least one manually entered completed contact address in an address field in the message;
   checking for at least one potentially incorrect contact address by identifying, as the at least one potentially incorrect contact address, at least one manually entered completed contact address that does not have a matching entry in a local contact address data store;
   notifying in a user interface of the at least one potentially incorrect contact address;
   performing a search of the local contact address data store to locate contact addresses similar to the at least one potentially incorrect contact address, after identifying that the at least one manually entered completed contact address does not have a matching entry in the local contact address data store, wherein each of said at least one potentially incorrect contact address comprises at least one of a misspelling of at least one contact address in the local contact address data store or a transposition of characters in at least one contact address in the local contact address data store;
   providing in the user interface a list of the contact addresses similar to the at least one potentially incorrect contact address; and
   when none of the contact addresses in the list provided in the user interface have been selected to correct the at least one potentially incorrect contact address, prompting in the user interface for a selection from at least one validation option to correct the at least one potentially incorrect contact address.

2. The method of claim 1, wherein the at least one validation option comprises manually correcting the at least one potentially incorrect contact address.

3. The method of claim 1, wherein said checking comprises checking the at least one entered contact address for proper syntax.

4. The method of claim 1, wherein said detecting comprises contacting a remote contact service to allow browsing of a remote contact address store and entering the at least one contact address.

5. The method of claim 4, further comprising prior to said detecting, allowing entering a few characters of one of a desired contact address and a name associated with the desired contact address and providing in the user interface a list of matching contact addresses found in the remote contact address data store.

6. The method of claim 1, wherein the at least one validation option comprises: accepting the at least one potentially incorrect contact address as a correct contact address, manually correcting the at least one potentially incorrect contact address, or remotely looking up a correct contact address for the at least one potentially incorrect contact address.

7. The method of claim 1, further comprising performing a search of a remote contact address data store to locate contact addresses similar to the at least one potentially incorrect contact address, and providing a list of the contact addresses similar to the at least one potentially incorrect contact address located in said search of the remote contact address data store, wherein each of said at least one potentially incorrect contact address comprises at least one of a misspelling of at least one contact address in the remote contact address data store or a transposition of characters in at least one contact address in the remote contact address data store.

8. A non-transitory computer-readable medium comprising a plurality of instructions executable on a computing device for implementing a contact address entry method, said method comprising:
   detecting entry of at least one manually entered completed contact address in an address field in the message;
   checking for at least one potentially incorrect contact address by identifying, as the at least one potentially incorrect contact address, at least one manually entered completed contact address that does not have a matching entry in a local contact address data store;
   notifying in a user interface of the at least one potentially incorrect contact address;

performing a search of the local contact address data store to locate contact addresses similar to the at least one potentially incorrect contact address, after identifying that the at least one manually entered completed contact address does not have a matching entry in the local contact address data store, wherein each of said at least one potentially incorrect contact address comprises at least one of a misspelling of at least one contact address in the local contact address data store or a transposition of characters in at least one contact address in the local contact address data store;

providing in the user interface a list of the contact addresses similar to the at least one potentially incorrect contact address; and when none of the contact addresses in the list provided in the user interface have been selected to correct the at least one potentially incorrect contact address, prompting in the user interface for a selection from at least one validation option to correct the at least one potentially incorrect contact address.

9. A mobile communication device comprising:
a main processor for controlling the operation of the mobile communication device;
a communication subsystem connected to the main processor, the communication subsystem being adapted for wirelessly sending and receiving data;
a message application that interfaces with the communication subsystem to send and receive messages, and to receive contact data from a remote contact service;
a local contact address data store; and,
a contact lookup module configured to:
detect entry of at least one manually entered completed contact address in an address field in the message;
check for at least one potentially incorrect contact address by identifying, as the at least one potentially incorrect contact address, at least one manually entered completed contact address that does not have a matching entry in a local contact address data store;
notify in a user interface of the at least one potentially incorrect contact address;
perform a search of the local contact address data store to locate contact addresses similar to the at least one potentially incorrect contact address after identifying that the at least one manually entered completed contact address does not have a matching entry in the local contact address data store, wherein each of said at least one potentially incorrect contact address comprises at least one of a misspelling of at least one contact address in the local contact address data store or a transposition of characters in at least one contact address in the local contact address data store;
provide in the user interface a list of the contact addresses similar to the at least one potentially incorrect contact address; and
prompt in the user interface for a selection from at least one validation option to correct the at least one potentially incorrect contact address.

10. The mobile communication device of claim 9, wherein the at least one validation option comprises manually correcting the at least one potentially incorrect contact address.

11. The mobile communication device of claim 9, wherein the contact lookup module checks the entered contact addresses for proper syntax.

12. The mobile communication device of claim 9, wherein the contact lookup module is further configured to contact a remote contact service to allow browsing of a remote contact address store and entering the at least one contact address.

13. The mobile communication device of claim 9, wherein the contact lookup module is further configured to perform a search of a remote contact address data store to locate contact addresses similar to the at least one potentially incorrect contact address, and to provide a list of the contact addresses similar to the at least one potentially incorrect contact address located in said search of the remote contact address data store, wherein each of said at least one potentially incorrect contact address comprises at least one of a misspelling of at least one contact address in the remote contact address data store or a transposition of characters in at least one contact address in the remote contact address data store.

14. A system comprising:
a mobile device comprising:
a main processor for controlling the operation of the mobile device;
a communication subsystem connected to the main processor, the communication subsystem being adapted for wirelessly sending and receiving data;
a message application that interfaces with the communication subsystem to send and receive messages, and to receive contact data;
a local contact address data store; and,
a contact lookup module configured to:
detect entry of at least one manually entered completed contact address in an address field in the message;
check for at least one potentially incorrect contact address by identifying, as the at least one potentially incorrect contact address, at least one manually entered completed contact address that does not have a matching entry in a local contact address data store;
notify in a user interface of the at least one potentially incorrect contact address;
perform a search of the local contact address data store to locate contact addresses similar to the at least one potentially incorrect contact address after identifying that the at least one manually entered completed contact address does not have a matching entry in the local contact address data store, wherein each of said at least one potentially incorrect contact address comprises at least one of a misspelling of at least one contact address in the local contact address data store or a transposition of characters in at least one contact address in the local contact address data store;
provide in the user interface a list of the contact addresses similar to the at least one potentially incorrect contact address; and
prompt in the user interface for a selection from at least one validation option to correct the at least one potentially incorrect contact address;
a remote contact service for providing the contact data to the mobile device, the contact data including at least one contact address; and,
a wireless network for providing communication between the mobile device and the remote contact service.

15. The system of claim 14, wherein the at least one validation option comprises manually correcting the at least one potentially incorrect contact address.

16. The system of claim 14, wherein the contact lookup module checks the entered at least one contact address for proper syntax.

17. The system of claim 14, wherein the remote contact service is provided by a contact server associated with one of a corporate enterprise and a website.

18. The system of claim 14, wherein the contact lookup module is further configured to perform a search of a remote contact address data store to locate contact addresses similar to the at least one potentially incorrect contact address, and to provide a list of the contact addresses similar to the at least one potentially incorrect contact address located in said search of the remote contact address data store, wherein each of said at least one potentially incorrect contact address comprises at least one of a misspelling of at least one contact address in the remote contact address data store or a transposition of characters in at least one contact address in the remote contact address data store.

* * * * *